(12) United States Patent
Ohnishi et al.

(10) Patent No.: US 12,299,066 B2

(45) Date of Patent: May 13, 2025

(54) FUNCTION GENERATION APPARATUS, METHOD FOR GENERATING FUNCTION, AND STORAGE MEDIUM

(71) Applicants: KEIO UNIVERSITY, Tokyo (JP); Motion Lib, Inc., Kawasaki (JP)

(72) Inventors: Kouhei Ohnishi, Kanagawa (JP); Takahiro Mizoguchi, Kanagawa (JP)

(73) Assignees: KEIO UNIVERSITY, Tokyo (JP); Motion Lib, Inc., Kawasaki (JP)

( * ) Notice: Subject to any disclaimer, the term of this patent is extended or adjusted under 35 U.S.C. 154(b) by 1078 days.

(21) Appl. No.: 17/272,439

(22) PCT Filed: Sep. 2, 2019

(86) PCT No.: PCT/JP2019/034494

§ 371 (c)(1),
(2) Date: Mar. 1, 2021

(87) PCT Pub. No.: WO2020/050232

PCT Pub. Date: Mar. 12, 2020

(65) Prior Publication Data

US 2021/0334336 A1 Oct. 28, 2021

(30) Foreign Application Priority Data

Sep. 3, 2018 (JP) .................. 2018-164836

(51) Int. Cl.
*G06F 17/16* (2006.01)
*G05B 19/408* (2006.01)
*G06F 7/76* (2006.01)

(52) U.S. Cl.
CPC .......... *G06F 17/16* (2013.01); *G05B 19/408* (2013.01); *G06F 7/76* (2013.01); *G05B 2219/39063* (2013.01); *G05B 2219/39398* (2013.01)

(58) Field of Classification Search
CPC ......... G05B 19/408–4086; G05B 2219/39063; G05B 2219/39398–39399; G06F 17/16; G06F 7/76
See application file for complete search history.

(56) References Cited

U.S. PATENT DOCUMENTS

2016/0207196 A1\* 7/2016 Ohnishi ................. B25J 9/1633
2018/0200890 A1\* 7/2018 Oumi ..................... B25J 9/1671
(Continued)

FOREIGN PATENT DOCUMENTS

| JP | H08145007 A | 6/1996 |
| JP | 2002312003 A | 10/2002 |
| WO | 2015041046 A1 | 3/2015 |

OTHER PUBLICATIONS

International Search Report (ISR) (and English translation thereof) dated Nov. 5, 2019 issued in International Application No. PCT/JP2019/034494.

(Continued)

*Primary Examiner* — Matthew D Sandifer
(74) *Attorney, Agent, or Firm* — Holtz, Holtz & Volek PC

(57) ABSTRACT

A function generation apparatus includes a function setter, a data string selector, and a matrix generator. The function setter sets a target function in an apparatus to be controlled. The data string selector selects, from among data strings indicating a plurality of combinations of parameters that can be reflected in control in the apparatus to be controlled, data strings according to the function set by the function setter. The matrix generator generates a transformation matrix according to the target function using the data strings selected by the data string selector as elements.

6 Claims, 7 Drawing Sheets

(56) References Cited

U.S. PATENT DOCUMENTS

2019/0143510 A1 5/2019 Ohnishi et al.
2020/0376681 A1 12/2020 Ohnishi et al.

OTHER PUBLICATIONS

Written Opinion dated Nov. 5, 2019 issued in International Application No. PCT/JP2019/034494.

* cited by examiner

| ALL ROW VECTORS (1 WHEEL) |
|---|
| $(\alpha 1, 0, 0)$ |
| $(0, \alpha 2, 0)$ |
| $(0, 0, \alpha 3)$ |
| $(\alpha 1, \alpha 2, 0)$ |
| $(\alpha 1, 0, \alpha 3)$ |
| $(0, \alpha 2, \alpha 3)$ |
| $(\alpha 1, \alpha 2, \alpha 3)$ |

FIG. 5

| ALL ROW VECTORS (4 WHEELS) | | | |
|---|---|---|---|
| ROW VECTORS OF WHEEL W1 | ROW VECTORS OF WHEEL W2 | ROW VECTORS OF WHEEL W3 | ROW VECTORS OF WHEEL W4 |
| ($\alpha$1, 0, 0, | $\alpha$4, 0, 0, | $\alpha$7, 0, 0, | $\alpha$10, 0, 0) |
| ($\alpha$1, 0, 0, | $\alpha$4, 0, 0, | $\alpha$7, 0, 0, | 0, $\alpha$11, 0) |
| ($\alpha$1, 0, 0, | $\alpha$4, 0, 0, | $\alpha$7, 0, 0, | 0, 0, $\alpha$12) |
| ⋮ | ⋮ | ⋮ | ⋮ |

FIG. 7

[Figure showing Transformation Matrix X1 and Transformation Matrix X2 with block diagonalization]

FUNCTION GENERATION APPARATUS, METHOD FOR GENERATING FUNCTION, AND STORAGE MEDIUM

TECHNICAL FIELD

The present invention relates to a function generation apparatus that generates a function of an apparatus that performs a mechanical operation, a method for generating a function, and a storage medium.

BACKGROUND ART

Various apparatuses that perform mechanical operations, such as automobiles and industrial machines, have been conventionally used. Mechanical behavior of mechanisms included in such an apparatus is controlled, for example, by actuators achieved by an electric motor, a hydraulic system, and the like.

In the case of an automobile, for example, a motor controls rotation (turning) of wheels against a road surface, a steering device controls a direction of the wheels, and a suspension device controls vertical movement of the wheels.

Similarly, in the case of a sewing machine, a printer, or the like, a conveying device controls movement of an object to be processed (cloth, paper, etc.).

Such an apparatus generally achieves a target function while acting on an environment with actuators.

That is, actuators are provided in accordance with degrees of freedom of operation of an apparatus, and certain parameters indicating behavior of the apparatus are determined by acting on an environment with mechanical elements controlled by the actuators.

For this reason, a function achieved in an apparatus that performs a mechanical operation varies depending on which actuators are controlled in what way.

Now, PTL 1 discloses a position/force control apparatus that achieves a target function by defining a coordinate transformation of control energy into domains of velocity (position) and force to be set in accordance with a function of a system to be controlled and controlling velocity (position) and force through the defined coordinate transformation.

CITATION LIST

Patent Literature

[PTL 1] International Publication. No. 2015/041046

SUMMARY OF INVENTION

Technical Problem

If a target function changes in a system to be controlled when coordinate transformations of control energy in domains of velocity (position) and force to be set are defined in accordance with the function of the system to be controlled as described in PTL 1, however, a different coordinate transformation needs to be used in accordance with a new function.

A target function in a system to be controlled, on the other hand, can variously change, and it is not necessarily easy to prepare coordinate transformations according to the various changes in advance.

It has therefore been difficult to flexibly achieve a target function in an apparatus that performs a mechanical operation.

A function generation apparatus according to an aspect of the present invention includes: a function setter for setting a target function in an apparatus to be controlled; a data string selector for selecting, from among data strings indicating a plurality of combinations of parameters that can be reflected in control in the apparatus to be controlled, data strings according to the function set by the function setter; and a matrix generator for generating a transformation matrix according to the target function using the data strings selected by the data string selector as elements.

Advantageous Effects of Invention

According to the resent invention, a target function can be achieved more flexibly in an apparatus that performs a mechanical operation.

BRIEF DESCRIPTION OF DRAWINGS

FIG. 5 is a schematic diagram illustrating row vectors corresponding to all combinations of parameters of four wheels of the mobile object at a time when the parameters are reflected in control.

FIG. 7 is a schematic diagram illustrating a concept in which a transformation matrix X2 is generated by performing block diagonalization on a transformation matrix X1 generated by a matrix generation unit.

DESCRIPTION OF EMBODIMENT

An embodiment of the present invention will be described hereinafter with reference to the drawings.

First, a basic principle applied to a function generation apparatus, a method for generating a function, and a program according to the present invention will be described.

[Basic Principle]

It is assumed in the present invention that a target function in an apparatus that performs a mechanical operation is achieved by defining a coordinate transformation of control energy into domains of velocity (position) and force according to the target function and controlling at least either velocity (position) or force through the defined coordinate transformation. That is, in the present invention, control based on a method for controlling velocity (position) and force described in International Publication No. 2015/041046, for example, may be used.

In general, an apparatus that performs a mechanical operation has degrees of freedom of operation (modes of operation) corresponding to modes of an environment. The modes of an environment are determinants, in an environment, of parameters that can be controlled by an apparatus that performs a mechanical operation. That is, an apparatus that performs a mechanical operation has the number of degrees of freedom corresponding to the number of modes of operation coupled with the modes of an environment, and actuators control parameters corresponding to the degrees of freedom.

Here, a target function in an apparatus that performs a mechanical operation is determined by how parameters corresponding to which ones of degrees of freedom of operation of the apparatus are reflected in control of the actuators.

In the present invention, therefore, a coordinate transformation of control energy into domains of velocity (position) and force to be set is defined in accordance with a target function is defined by preparing all combinations of parameters (physical quantities) that are elements of behavior of the apparatus as row vectors (data strings) and constructing a transformation matrix by selecting certain ones of the row vectors that suit the target function in the apparatus.

Figure 1:
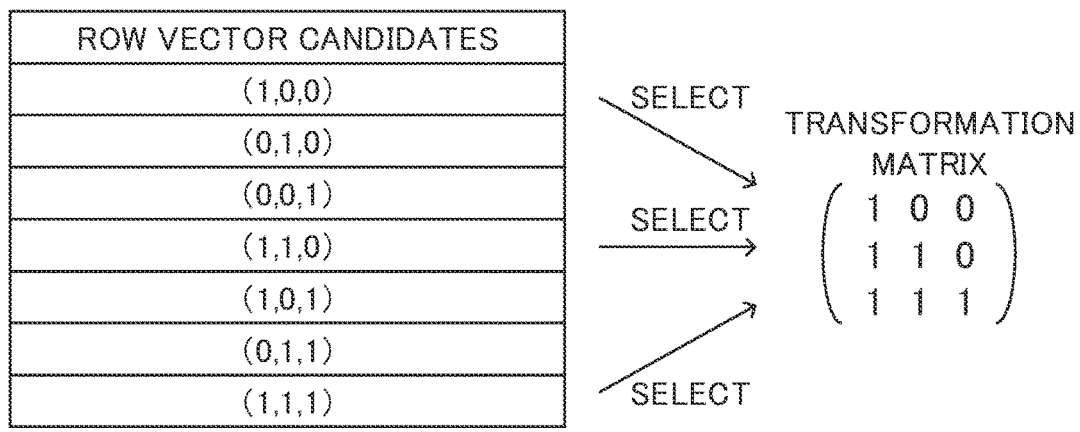
FIG. 1 is a schematic diagram illustrating a concept in which a transformation matrix according to a target function is constructed in the present invention.

FIG. 1 is a schematic diagram illustrating a concept in which a transformation matrix according to a target function is constructed in the present invention.

When there are three degrees of freedom of operation in an apparatus that performs a mechanical operation, a parameter P1 corresponding to a first degree of freedom, a parameter P2 corresponding to a second degree of freedom, and a parameter P3 corresponding to a third degree of freedom are obtained as parameters that are elements of behavior of the apparatus (parameters indicating operation).

As to which of these parameters P1 to P3 are reflected in control, there are a total of seven combinations ($_3C_1 + _3C_2 + _3C_3$) of control modes of the parameters P1 to P3 as shown in FIG. 1 as "row vector candidates" in FIG. 1, where "1" indicates that a parameter is reflected in control and "0" indicates that a parameter is not reflected in control.

When only the parameter P1 is to be reflected in control and the parameters P2 and P3 are not to be reflected in control among all these row vectors, for example, a first row (1, 0, 0) of the "row vector candidates" in FIG. 1 is selected.

Alternatively, when the parameters P1 and P2 are to be reflected in control and the parameter P3 is not to be reflected in control, for example, a fourth row (1, 1, 0) of the "row vector candidates" in FIG. 1 is selected.

When row vectors are selected as illustrated in FIG. 1, the same row vector may be selected for a plurality of rows.

In addition, when processing for control is performed in practice, a transformation matrix that includes "a" (a is a real number other than 0) by setting weights for elements "1" in row vectors of parameters to be reflected in control may be constructed.

A transformation matrix constructed in this manner reflects certain parameters that are elements of behavior of an apparatus that performs a mechanical operation and controls parameters corresponding to certain degrees of freedom.

That is, actuators corresponding to the certain degrees of freedom are controlled in accordance with states of the parameters that are the elements of the behavior of the apparatus that performs a mechanical operation.

As a result, feedback control for the certain elements (the parameters corresponding to the certain degrees of freedom) of the behavior of the apparatus that performs a mechanical operation can be achieved, thereby achieving a target function.

In the present invention, a transformation matrix is thus constructed by selecting, from among row vectors indicating all combinations of parameters that can be reflected in control in an apparatus that performs a mechanical operation, certain row vectors that suit a target function in the apparatus.

According to the present invention, therefore, a target function can be flexibly achieved in an apparatus than performs a mechanical operation.

An embodiment of the function generation apparatus to which the present invention is applied will be specifically described hereinafter.

[Specific Example of Function Generation Apparatus]

Figure 2:
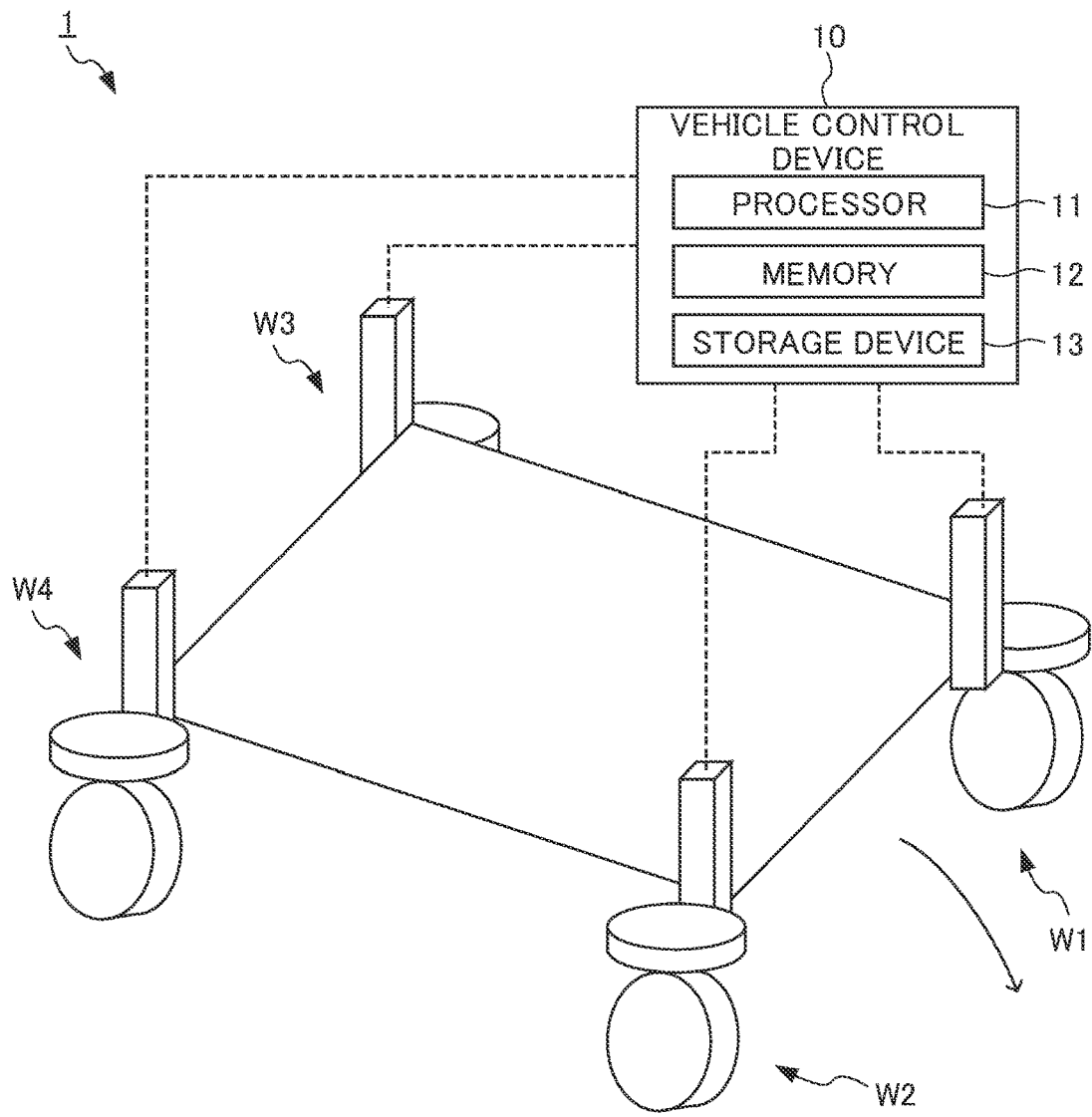
FIG. 2 is a schematic diagram illustrating the configuration of a mobile object according to an embodiment of the present invention.

FIG. 2 is a schematic diagram illustrating the configuration of a mobile object 1 according to an embodiment of the present invention.

The mobile object 1 is achieved as an example of the function generation apparatus to which the present invention is applied, and will be described hereinafter as a vehicle whose four wheels can be independently subjected to control of rotation, steering, and suspension. Specific examples of the mobile object 1 include apparatuses with a plurality of wheels, such as an automobile, an electric wheelchair, a dolly for carrying goods on a production line, a forklift, and a cart used in a golf course.

As illustrated in FIG. 2, the mobile object 1 includes front and rear, left and right wheels W1 to W4 and a vehicle control device 10 that controls the entirety of the mobile object 1. Although not illustrated in the figure, the mobile object 1 is also provided with various devices necessary to achieve the mobile object 1, such as a steering wheel, an accelerator pedal for acceleration, and a brake pedal for braking.

Figures 3, 4:
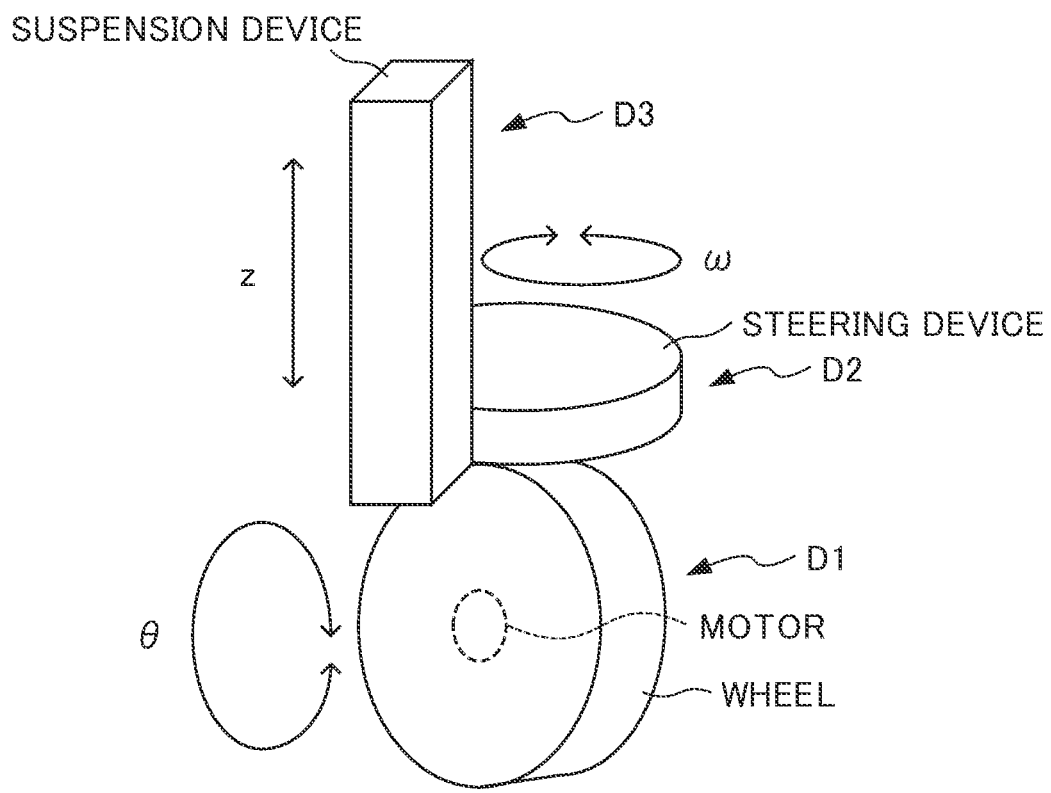
FIG. 3 is a schematic diagram illustrating the configuration of a wheel of the mobile object.
FIG. 4 is a schematic diagram illustrating row vectors corresponding to all combinations of parameters of the wheel of the mobile object at a time when the parameters are reflected in control.

FIG. 3 is a schematic diagram illustrating the configuration of a wheel (each of the front and rear, left and right wheels W1 to W4) of the mobile object 1.

As illustrated in FIG. 3, each of the wheels of the mobile object has a configuration (three degrees of freedom) capable of controlling the rotation of the wheel, the steering of the wheel, and a vertical position (suspension) of the wheel, respectively.

In the configuration illustrated in FIG. 3, each of the wheels of the mobile object 1 is provided with sensors D1 to D3 that detect a rotation angle θ, a steering angle ω, and a vertical position z, respectively, of the wheel. Results of detection performed by the sensors D1 to D3 are sequentially input to the vehicle control device 10.

Here, as to which of the rotation angle θ, the steering angle ω, and the vertical position z of the wheel are reflected in control, row vectors corresponding to all combinations of the rotation angle θ, the steering angle ω, and the vertical position z may be defined as in FIG. 1. When the rotation angle θ, the steering angle ω, and the vertical position z of the wheel are reflected in control, mutually replaceable parameters may be obtained, for example, by differentiating or integrating the rotation angle θ, the steering angle ω, and the vertical position z as necessary and input, FIG. 4 is a schematic diagram illustrating row vectors corresponding to all combinations of parameters of a wheel of the mobile object 1 at a time when the parameters are reflected in control.

If weights at a when the rotation angle θ, the steering angle ω, and the vertical position z of the wheel are reflected in control are denoted by α1, α2, and α3, respectively, which are real numbers other than 0, there are a total of seven combinations of the parameters of the wheel at a time when the parameters are reflected in control as illustrated in FIG. 4.

FIG. 5 is a schematic diagram illustrating row vectors corresponding to all combinations of parameters of the four wheels of the mobile object 1 at a time when the parameters are reflected in control.

In FIG. 5, α1 to α12 are weights at a time when parameters of the wheel W1 (the rotation angle θ, the steering angle ω, and the vertical position z), parameters of the wheel W2 (the rotation angle θ, the steering angle ω, and the vertical position z), parameters of the wheel W3 (the rotation angle θ, the steering angle ω, and the vertical position z), and parameters of the wheel W4 (the rotation angle θ, the steering angle ω, and the vertical position z), respectively, are reflected in control.

Since there are seven combinations (row vectors) for each of the wheels of the mobile object 1 as illustrated in FIG. 4, the total number of possible row vectors is $7^4=2,401$ for the four wheels W1 to W4.

The row vectors illustrated in FIG. 5 indicate all combinations as to which of the parameters of the wheels W1 to W4 of the mobile object 1 are to be reflected in control at a time when the rotation angles, the steering angles, and the vertical positions of the four wheels are controlled.

The vehicle control device 10 is achieved by a vehicle computer (information processing device) including a processor 11, a memory 12, a storage device 13, and the like.

The vehicle control device 10 selects, from among all the row vectors for controlling the four wheels, row vectors according to a target function in the mobile object 1.

In the present embodiment, row vectors to be selected from among the row vectors illustrated in FIG. 5 are set in accordance with a function to be achieved in the mobile object 1.

When steering of the four wheels is controlled, for example, row vectors for reflecting the steering angles ω of the four wheels are selected as row vectors for calculating the steering angles ω of the wheels.

When steering of the four wheels and roll angles during turning are controlled, row vectors for reflecting the steering angles ω and the vertical positions z of the four wheels are selected.

After row vectors are selected in this manner for the parameters corresponding to the degrees of freedom of the wheels W1 to W4, a transformation matrix X1 for achieving a target function in the mobile object 1 is generated.

In the present embodiment, the vehicle control device 10 performs block diagonalization on the transformation matrix X1 generated in this manner to generate a transformation matrix X2 and controls the mobile object 1 using the transformation matrix X2.

Since the transformation matrix X2 has been subjected to the block diagonalization, for example, the amount of processing can be reduced, and different processors can perform distributed processing for different blocks.

[Functional Configuration of Vehicle Control Device 10]

Figure 6:
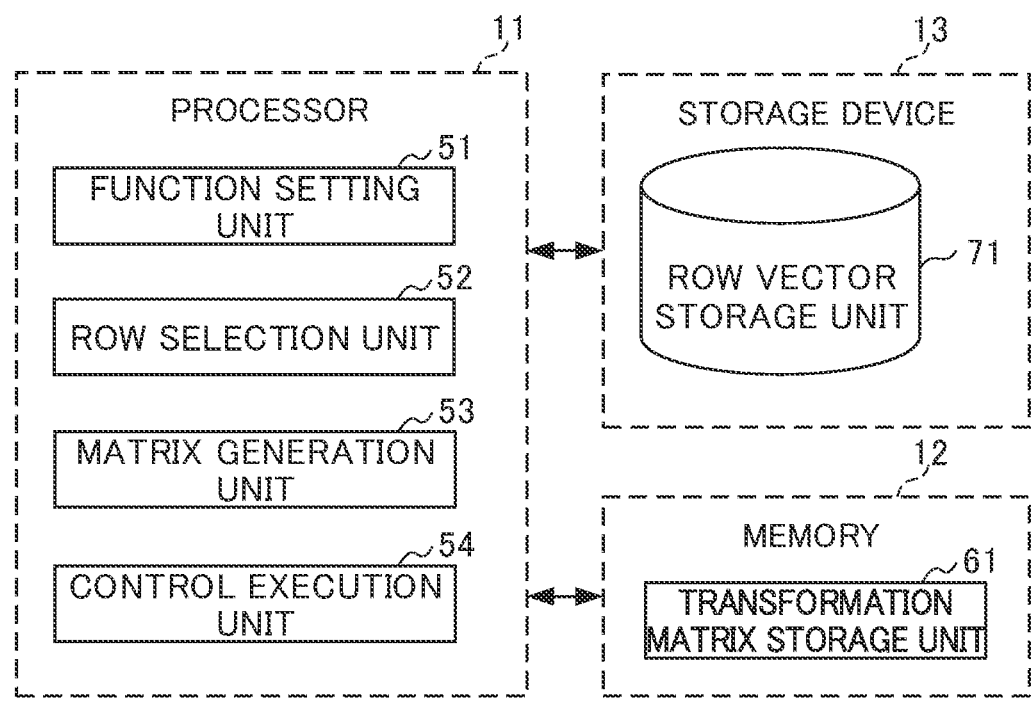
FIG. 6 is a block diagram illustrating the functional configuration of a vehicle control device.

FIG. 6 is a block diagram illustrating the functional configuration of the vehicle control device 10.

As illustrated in FIG. 6, the vehicle control device 10 includes, as functions of the processor 11, a function setting unit 51, a row selection unit 52, a matrix generation unit 53, and a control execution unit 54. A transformation matrix storage unit 61 is formed in the memory 12, and a row vector storage unit 71 is formed in the storage device 13.

The transformation matrix storage unit 61 stores transformation matrices generated in order to achieve target functions in the vehicle control device 10.

The row vector storage unit 71 stores a list of row vectors indicating all combinations of the parameters of the four wheels as to which of the parameters are to be reflected in control.

The function setting unit 51 sets a target function (a type of function) in the mobile object 1. In the mobile object 1 according to the present embodiment, a manual setting mode, in which a user manually sets a target function, and an automatic setting mode, in which a target function is automatically set in accordance with a driving state of the mobile object 1, are prepared. In the manual setting mode, the function setting unit 51 employs settings made by the user as the target function. In the automatic setting mode, the function setting unit 51 sets, on the basis of one or more of elements that determine a driving state of the mobile object 1 including vehicle velocity, yaw rate, and driving environment (an expressway or a city area, or a road surface condition, etc.), a function associated with the element(s) in advance.

The row selection unit 52 selects, from the list of row vectors stored in the row vector storage unit 71, row vectors associated with the function set by the function setting unit 51 (row vectors set in such a way as to be selected in accordance with the function) on the basis of the set function. At this time, the row selection unit 52 selects a row vector for each of the parameters corresponding to degrees of freedom of operation of the mobile object 1 (parameters to be controlled).

The matrix generation unit 53 generates a transformation matrix X1 for achieving the set function using the row vectors selected by the row selection unit 52.

The matrix generation unit 53 also sets, in the generated transformation matrix, a weight α for each of elements of the row vectors.

State values of the parameters corresponding to an input are calculated using the row vectors set in this manner, and feedback control is performed on actuators such that the actuators follow control target values set for the state values. When the wheel W1 and the wheel W2 are steered in phase by the same angle, for example, a row vector for calculating a state value of the steering angle ω of the wheel W1 may be set while setting "−1" as a weight for the steering angle ω of the wheel W1 and "1" as a weight for the steering angle ω of the wheel W2. By then setting "0" (a state in which there is no difference from the steering angle of the wheel W2) for a state value of the steering angle ω of the wheel W1 as a control target value, an actuator for controlling the wheel W1 can steer the wheel 1 in phase with the wheel W2 by the same angle.

In addition, in the present embodiment, the matrix generation unit generates a transformation matrix X2 by performing block diagonalization on the generated transformation matrix X1.

FIG. 7 is a schematic diagram illustrating a concept in which the transformation matrix X2 is generated by performing block diagonalization on the transformation matrix X1 generated by a matrix generation unit 53.

In FIG. 7, θ1 to θ4, φ1 to φ4, and Z1 to Z4 in an output are state values of rotation angles φ1 to φ4, steering angles φ1 to φ4, and vertical positions z1 to z4, respectively, of the wheels in an input, and suffixes 1 to 4 indicate that the parameters correspond to the wheels W1 to W4, respectively. In addition, α1 to α12 are weights at a time when the parameters of the wheel W1 (θ1, φ1, and z1), the parameters of the wheel W2 θ2, φ2, and z2), the parameters of the wheel W3 (θ3, φ3, and z3), and the parameters of the wheel W4 (θ4, φ4, and z4) in the input are reflected in control, respectively.

As illustrated in FIG. 7, since simple processing can be performed with each block arranged as a diagonalized matrix as a result of block diagonalization, where elements of row vectors of the transformation matrix X1 and arrangement of input parameters are changed, the amount of processing can be reduced. In addition, different processors can perform distributed processing for different blocks.

The control execution unit 54 calculates a state value for each input parameter using the transformation matrix X2 generated by the matrix generation unit 53. As described above, a control target value is set for each of these state values, and the control execution unit 54 calculates an input (a current instruction value etc.) to each of the actuators such that sequentially input state values for each parameter follow the control target value. That is, the control execution unit 54 performs feedback control relating to elements (parameters corresponding to degrees of freedom) of behavior of the mobile object 1 through the transformation matrix X2 for achieving a target function.

Alternatively, the control execution unit 54 may perform control using the transformation matrix X1 instead of the transformation matrix X2.

Operation

Next, the operation of the mobile object 1 will be described.

Figure 8:
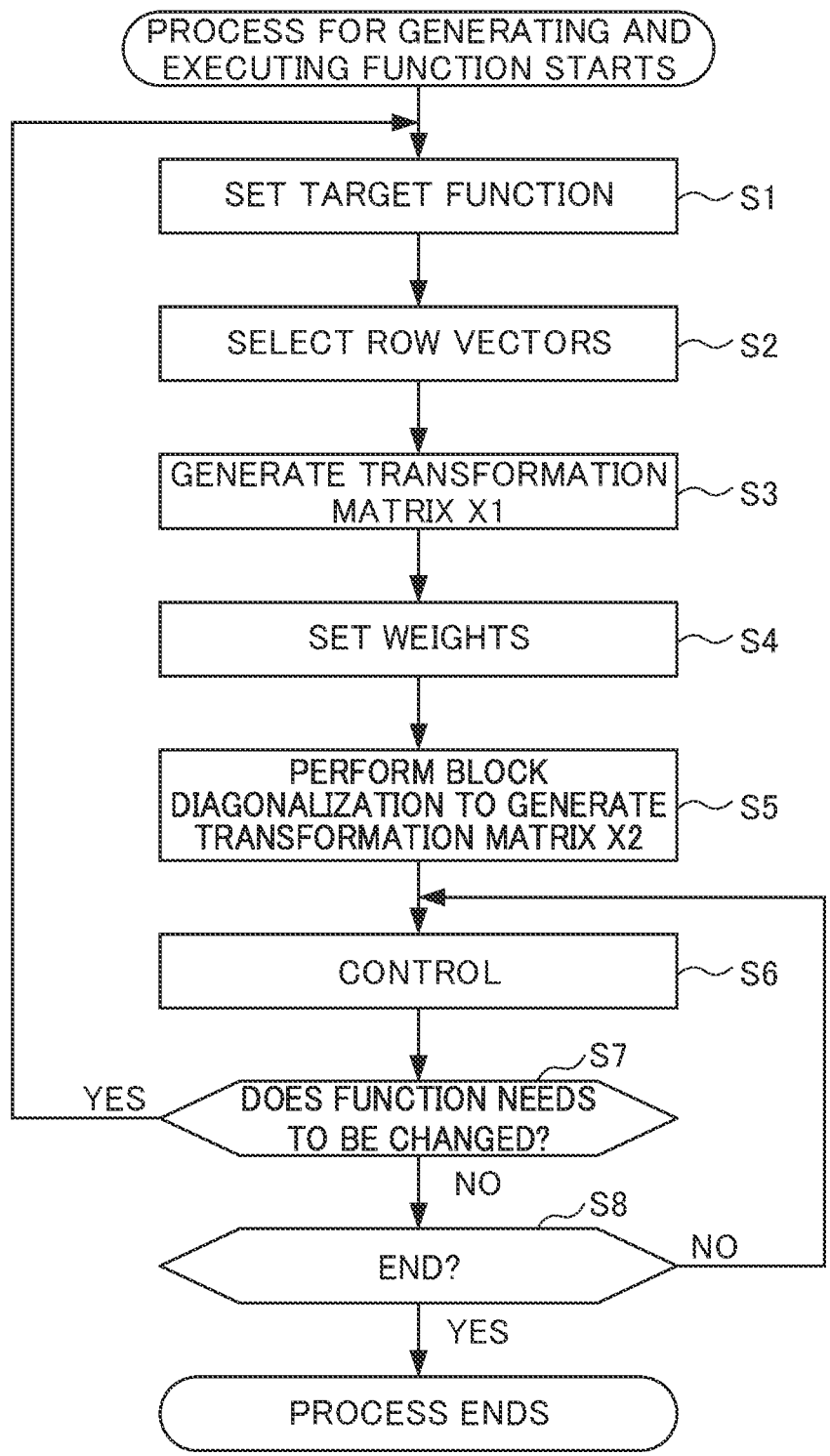
FIG. 8 is a flowchart illustrating how a process for generating and executing a function performed by the mobile object proceeds.

FIG. 8 is a flowchart illustrating how a process for generating and executing a function performed by the mobile object 1 proceeds.

The process for generating and executing a function starts when an ignition of the mobile object 1 is turned on.

In step S1, the function setting unit 51 sets a target function in the mobile object 1.

In step S2, the row selection unit 52 selects, from the list of row vectors stored in the row vector storage unit 71, row vectors associated with the function set by the function setting unit 51 (row vectors set in such a way as to be selected in accordance with a function) on the basis of the set function.

In step S3, the matrix generation unit 53 generates a transformation matrix X1 for achieving the set function using the row vectors selected by the row selection unit 52.

In step S4, the matrix generation unit 53 sets a weight αk (k is a number indicating a parameter corresponding to a degree of freedom) for each element of the row vectors in the generated transformation matrix.

In step S5, the matrix generation unit 53 performs block diagonalization on the generated transformation matrix X1 to generate the transformation matrix X2.

In step S6, the control execution unit 54 calculates a state value for each of the input parameters using the transformation matrix X2 generated by the matrix generation unit 53 and controls the mobile object 1.

In step S7, the function setting unit 51 determines whether the function set in the mobile object 1 needs to be changed. Whether the function set in the mobile object 1 needs to be changed can be determined, for example, on the basis of whether there has been switching between the manual setting mode and the automatic setting mode or whether a driving state of the mobile object 1 has changed in the automatic setting mode.

If the function set in the mobile object 1 needs to be changed, a result of the determination in step S7 is YES, and the process proceeds to step S1.

If the function set in the mobile object 1 needs not be changed, on the other hand, the result of the determination in step S7 is NO, and the process proceeds to step S8.

In step S8, the control execution unit 54 determines whether there has been an instruction to end the process for generating and executing a function. Whether there has been an instruction to end the process for generating and exbouting a function can be determined, for example, on the basis of whether the ignition of the mobile object 1 has been turned off.

If there has not been an instruction to end the process for generating and executing a function, a result of the determination in step S8 is NO, and the process proceeds to step S6.

If there has been an instruction to end the process for generating and executing a function, on the other hand, the result of step S8 is YES, and the process for generating and executing a function ends.

As a result of this process, row vectors according to a target function are selected from row vectors corresponding to all combinations of the parameters of the wheels of the mobile object 1 at a time when the parameters are reflected in control.

Weights according to the target function are then set for elements of a transformation matrix including the selected row vectors to generate a transformation matrix X1.

Furthermore, an transformation matrix X2 is generated by performing block diagonalization on the transformation matrix X1, and the mobile object 1 is controlled using the transformation matrix X2.

A transformation matrix for achieving a target function set in the mobile object 1, therefore, can be set dynamically.

As a result, a target function can be achieved more flexibly in an apparatus that performs a mechanical operation.

First Modification

Although the mobile object 1 such as an automobile has been taken as a specific example of the function generation apparatus in the above embodiment, the function generation apparatus is not limited to this.

For example, the function generation apparatus can be achieved as a working object that perform works on another object.

Figure 9:
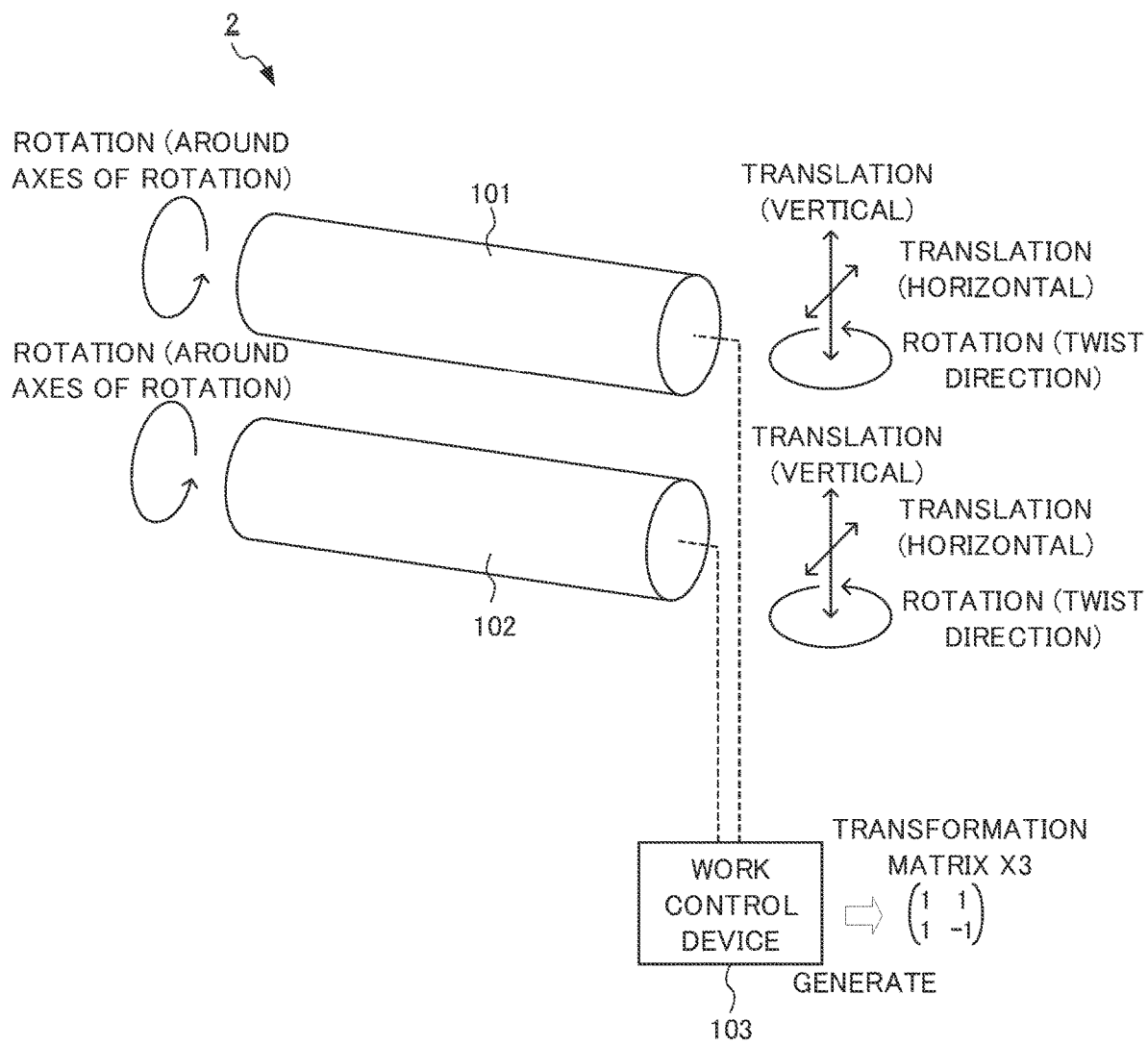
FIG. 9 is a schematic diagram illustrating the configuration of a working object according to an embodiment of the present invention.

FIG. 9 is a schematic diagram illustrating the configuration of a working object 2 according to an embodiment of the present invention.

The working object 2 is achieved as an example of the function generation apparatus to which the present invention is applied, and will be described as a conveying device that conveys an object to be processed. Specific examples of the working object 2 include a sewing machine and a conveying device such as a printer. With the working object 2, a function of conveying an object to be processed (cloth, paper, etc.) while rubbing the object or a function of controlling a position of the object to be processed while rubbing the object can be achieved. Alternatively, the working object 2 may be an assembly machine, a power tool, or the like that rotates an object to be processed, such as a screw, instead of a conveying device that conveys an object to be processed.

As illustrated in FIG. 9, the working object 2 includes a first roller 101, a second roller 102, and a work control device 103. The first roller 101 and the second roller 102 each include actuators corresponding to degrees of freedom of operation. Since these actuators are included, rotation about axes of rotation of the first roller 101 and the second roller 102, vertical translation and horizontal translation viewed from an axis of rotation direction, relative movement of the axes of rotation of the first roller 101 and the second roller 102 in a twist direction, and the like can be controlled, for example, as illustrated in FIG. 9.

The first roller 101 is in contact with a first surface (e.g., an upper surface) of the object to be processed and moves the first surface of the object to be processed through rotation about the axis of rotation with a force according to rotational torque at a velocity according to rotational velocity. In addition, the first roller 101 can perform operations such as the vertical translation and the horizontal translation viewed from the axis of rotation direction and the relative movement in the twist direction of the axis of rotation of the first roller 101 against the axis of rotation of the second roller 102 and reflect parameters indicating these operations in control.

The second roller 102 is in contact with a second surface (e.g., a lower surface) of the object to be processed and moves the second surface of the object to be processed through rotation about the axis of rotation with a force according to rotational torque at a velocity according to rotational velocity. In addition, the second roller 102 can perform operations such as the vertical translation and the horizontal translation viewed from the axis of rotation direction and the relative movement in the twist direction of the axis of rotation of the second roller 102 against the axis of rotation of the first roller 101 and reflect parameters indicating these operations in control.

The work control device 103 is achieved by a microcomputer (information processing device) including the processor 11, the memory 12, the storage device 13, and the like.

The work control device 103, as with the vehicle control device 10 according to the above embodiment, selects row vectors according to a target function in the working object 2 from among all row vectors for controlling actuators for moving the first roller 101 and actuators for moving the second roller 102.

If it is assumed as an example that the working object 2 has two degrees of freedom, namely rotation about the axis of rotation of the first roller 101 and rotation about the axis of rotation of the second roller 102, for example, there are a total of three combinations (1, 0), (0, 1), and (1, 1) as to whether to reflect a rotation angle of the first roller 101 and a rotation angle of the second roller 102 in control.

In addition, when weights at a time when the rotation angle of the first roller 101 and the rotation angle of the second roller 102 are reflected in control are denoted by $\beta 1$ and $\beta 2$, respectively, row vectors corresponding to all combinations at a time when the rotation angle of the first roller 101 and the rotation angle of the second roller 102 are reflected in control are:

($\beta 1$, 0);
(0, $\beta 2$); and
($\beta 1$, $\beta 2$).

If it is assumed here that the working object 2 achieves a function of conveying an object to be processed while rubbing the object, the rotational velocity of the first roller 101 and the second roller 102 needs to be controlled in the same direction, and the rotational torque of the first roller 101 and the second roller 102 needs to be controlled in opposite directions.

At this time, the row vector ($\beta 1$, $\beta 2$) is selected and weights $\beta 1=1$ and $\beta 2=1$ are set in order to control the rotational velocity of the first roller 101 and the second roller 102.

In addition, the row vector ($\beta 1$, $\beta 2$) is selected and weights $\beta 1=1$ and $\beta 2=-1$ are set in order to control the rotational torque of the first roller 101 and the second roller 102.

That is, when the working object 2 achieves the function of conveying the object to be processed while rubbing the object, a transformation matrix X3 illustrated in FIG. 9 is generated.

The working object 2 can achieve the function of conveying the object to be processed while rubbing the object by calculating state values for the input parameters (the rotation angle of the first roller 101 and the rotation angle of the second roller 102) using the transformation matrix X3 and performing control such that the state values follow set control target values. As a result of this function, for example, a sheet of paper to be fed can be securely picked out of a bundle of printing paper set in a inter and conveyed.

In addition, when the working object 2 achieves a different function, a transformation matrix can be dynamically generated by selecting row vectors according to the target function. As a result of this function, for example, when a standard straight stitching mode is set in a sewing machine, straight stitching can be performed while generating a transformation matrix for performing straight stitching. When a mode for decorative stitching is established, decorative stitching can be performed while generating a transformation matrix for performing decorative stitching.

The functional configuration of the work control device 103 and the operation of the working object 2 are substantially the same as in the above embodiment except that the specific example of the target function is different.

The basic principle of the present invention can thus be applied to various apparatuses including the mobile object 1 such as an automobile and the working object 2 that performs work on another object, and a function generation apparatus according to a specific apparatus mode to which the present invention is applied can be achieved.

As a result, a target function can be achieved more flexibly in an apparatus that performs a mechanical operation.

Second Modification

Although a case where the same apparatus (mobile object 1) generates a transformation matrix for achieving a target function and controls an apparatus to be controlled using the generated transformation matrix has been described as an example in the above embodiment, the same apparatus need not perform both the generation and the control.

That is, the function generation apparatus to which the present invention is applied may only generate a transformation matrix for achieving a target function and output the generated transformation matrix to another apparatus to be controlled. The apparatus to be controlled may then perform control based on the transformation matrix.

As described above, the mobile object 1 (function generation apparatus) according to the present embodiment includes the function setting unit 51, the row selection unit 52, and the matrix generation unit 53.

The function setting unit 51 sets a target function in an apparatus to be controlled.

The row selection unit 52 selects data strings according to the function set by the function setting unit 51 from among data strings indicating a plurality of combinations of parameters that can be reflect in control in the apparatus to be controlled. The matrix generation unit 53 generates a transformation matrix according to the target function using the data strings selected by the row selection unit 52 as elements.

As a result, a transformation matrix is constructed by selecting certain row vectors that suit a target function in an apparatus that performs a mechanical operation from among row vectors indicating a plurality of combinations of parameters that can be reflected in control in the apparatus.

According to the present invention, therefore, a target function can be flexibly achieved in an apparatus that performs a mechanical operation.

The matrix generation unit 53 sets weights for elements of a transformation matrix in accordance with a target function.

As a result, parameters to be reflected in control can be set in various manners, and various functions can be achieved.

The matrix generation unit 53 performs block diagonalization on a transformation matrix.

As a result, processing can be simplified when an apparatus to be controlled is controlled, and the amount of processing is reduced. In addition, different processors can perform distributed processing or the like for different blocks of a transformation matrix.

The mobile object 1 also includes the control execution unit 54.

The control execution unit 54 controls an apparatus to be controlled on the basis of a transformation matrix generated by the matrix generation unit 53.

As a result, ail apparatus to be controlled can be controlled using a transformation matrix dynamically generated in order to achieve a target function.

The function setting unit 51 determines whether a target function in an apparatus to be controlled needs to be changed and, if determining that the target function needs to be changed, changes the target function.

As a result, when a target function in an apparatus to be controlled needs to be changed, the apparatus can be controlled while changing a required function as necessary.

The present invention is not to be limited to the above-described embodiment. Various changes, modifications, etc. are also covered by the present invention as long as such changes, modifications, etc. fail in a range in which the object of the present invention can be achieved.

Although a case where the function generation apparatus is implemented as a mobile object such as an automobile has been taken as an example in the above embodiment, for example, the function generation apparatus is not limited to this. That is, the present invention can be applied when a physical quantity such as position, velocity, or force is controlled in an apparatus that performs a mechanical operation. For example, the present invention can be applied when various functions are achieved in various apparatuses that perform a mechanical operation, such as a drone, an airplane, a submarine, and a ship.

In addition, although row vector candidates are stored in advance in the above embodiment, row vector candidates need not be stored in advance. That is, row vector candidates may be generated as necessary at required timings, and row vectors that suit a target function may be selected from among the generated row vectors.

The process in the embodiments above can be realized by either hardware or software.

In other words, the functions that are capable of executing the process above only need to be provided in the function generation apparatus, and thus what functional structure and what hardware structure are to be used for realizing the functions are not limited to the examples above.

When the process above is to be executed by software, a program that constitutes the software is installed into a computer from a network or a storage medium.

The storage medium that stores the program is constituted by, for example, a removable medium that is distributed separately from the device body, or a storage medium that is previously built in the device body. The removable medium is constituted by, for example, a magnetic disk, an optical disc, or a magneto-optical disk. The optical disc is constituted by, for example, a CD-ROM (Compact Disk-Read. Only Memory), a DVD (Digital Versatile Disk), or a Blu-ray Disc (trademark). The magneto-optical disk is constituted by, for example, a MD (Mini-Disk). The storage medium that is previously built in the device body is constituted by, for example, a hard disk or ROM in which the program is stored.

The above embodiment is an example to which the present invention is applied, and does not limit the technical scope of the present invention. That is, the present invention may be subjected to various modifications such as omission and replacement without deviating from the spirit of thereof, and various embodiments other than that described above may be implemented. Various embodiments and modifications thereof that can be implemented in the present invention are included in the scope of the invention described in the claims and an equivalent scope.

REFERENCE SIGNS LIST

1 mobile object, 2 working object, 10 vehicle control device, processor, 12 memory, 13 storage device, 51 function setting unit, 52 row selection unit, 53 matrix generation unit, 54 control execution unit, 61 transformation matrix storage unit, 71 row vector storage unit, W1 to W4 wheel, 101 first roller, 102 second roller, 103 work control device

The invention claimed is:

1. A function generation apparatus comprising:
a hardware processor that is configured to:
set a target function in an apparatus to be controlled;
select, from among data strings indicating a plurality of combinations of parameters that can be reflected in control in the apparatus to be controlled, data strings according to the set target function;
generate a transformation matrix according to the target function using the selected data strings as elements; and
control the apparatus to be controlled, based on the generated transformation matrix.

2. The function generation apparatus according to claim 1, wherein the hardware processor sets weights for the elements of the transformation matrix in accordance with the target function.

3. The function generation apparatus according to claim 1, wherein the hardware processor performs block diagonalization on the transformation matrix.

4. The function generation apparatus according to claim 1, wherein the hardware processor determines whether the target function in the apparatus to be controlled needs to be changed and, if it is determined that the target function in the apparatus to be controlled needs to be changed, changes the target function.

5. A method for generating a function to be executed by an information processing apparatus, the method comprising:
   setting a target function in an apparatus to be controlled;
   selecting, from among data strings indicating a plurality of combinations of parameters that can be reflected in control in the apparatus to be controlled, data strings according to the set target function;
   generating a transformation matrix according to the target function using the selected data strings;
   controlling the apparatus to be controlled, based on the generated transformation matrix.

6. A non-transitory computer-readable storage medium having a program stored thereon that is executable by a computer to perform functions comprising:
   setting a target function in an apparatus to be controlled;
   selecting, from among data strings indicating a plurality of combinations of parameters that can be reflected in control in the apparatus to be controlled, data strings according to the set target function;
   generating a transformation matrix according to the target function using the selected data strings; and
   controlling the apparatus to be controlled, based on the generated transformation matrix.

* * * * *